United States Patent
Witte

[15] 3,691,605
[45] Sept. 19, 1972

[54] APPARATUS FOR MOUNTING HANDLES TO POTS AND THE LIKE

[72] Inventor: Günter Witte, Attendorn, Germany

[73] Assignee: Gebr. Dingerkus, Attendorn, Germany

[22] Filed: April 23, 1971

[21] Appl. No.: 136,906

[30] Foreign Application Priority Data

April 23, 1970  Germany..........P 20 19 571.5

[52] U.S. Cl. .............................29/200 J, 29/208 B
[51] Int. Cl. ........................B23p 19/00, B23p 19/04
[58] Field of Search...29/200 J, 200 P, 208 B, 200 R, 29/208 R

[56] References Cited

UNITED STATES PATENTS 3,103,062  9/1963  Himmelberger..........29/200 J
3,373,476  3/1968  Lombardo et al........29/208 B Primary Examiner—Thomas H. Eager
Attorney—Spencer & Kaye

[57] ABSTRACT

Apparatus for mounting insulated handles to pots and the like has a supporting portion having a part adapted to be mounted on a wall portion of a pot and the like and a section extending from the pot and defining protrusions. A handle is provided for completely covering the supporting portion and for defining a recess forming shoulders extending perpendicular to the direction of the extension of the section of the supporting portion. These shoulders face away from the part of the supporting portion adapted to be mounted on a wall portion of a pot and the like and is arranged to face towards the protrusions defined on the supporting portion. A substantially elongated spring element is unreleasably arranged in the recess defined in the handle by having its end portion bent about the protrusions and contacting the shoulders. In this manner, the spring element is retained and attaches the handle to the supporting portion.

7 Claims, 4 Drawing Figures

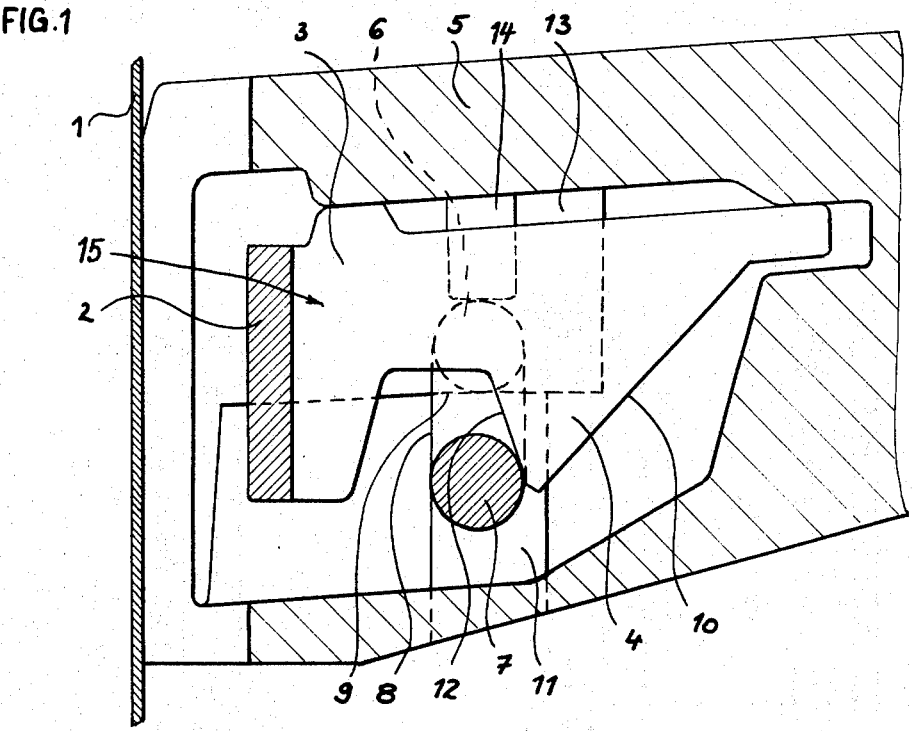
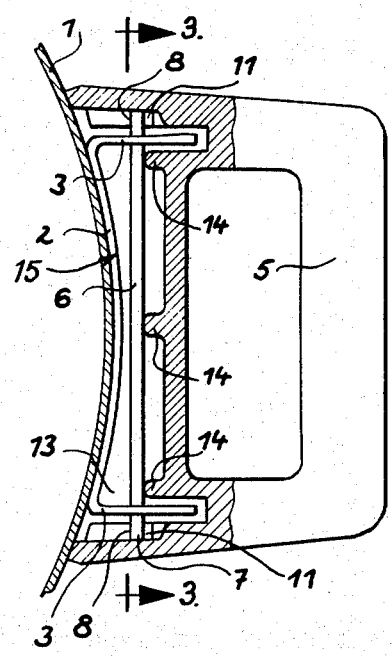
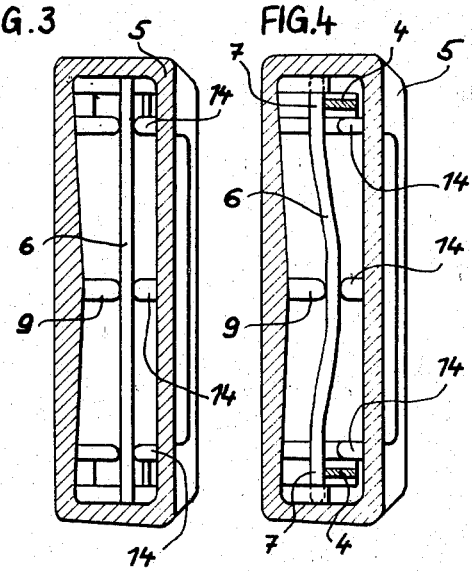

APPARATUS FOR MOUNTING HANDLES TO POTS AND THE LIKE

BACKGROUND OF THE INVENTION

The present invention relates to apparatus for mounting handles, and particularly to apparatus for mounting insulated handles to pots and the like. This apparatus has a support portion having a section extending from a wall portion of a pot and the like onto which a handle is arranged which completely covers the support portion and which is held by an unreleasable spring element which is bent around protrusions defined on the extending section of the supporting portion and is retained by shoulders formed in a recess defined in the handle.

A known handle mounting apparatus of this type has a U-shaped rod of spring wire attached to that surface of a handle which is intended to face a respective support portion. This rod has longitudinally and transversely notched arms which engage into respective holes provided in the handle. The ends of the legs of the U-shaped rod are arranged to be directly opposite one another. Moreover, the support portion is designed as a flat member and has a transverse groove provided on the surface facing the rod and engaging with the rod to serve as a detent for the rod.

A problem has been encountered with this known handle mounting apparatus, however. A feature of this known apparatus is that the legs of the U-shaped rod are held in the holes provided in the handle primarily by a force-fit. It has been found that this fit is so unreliable that two rods must be provided even for covers for pots. That is, the legs keep pulling out of the holes.

SUMMARY OF THE INVENTION

It is among the objects of the present invention to provide apparatus of the type mentioned above for mounting handles which insures a beter than heretofore possible dependability as regards maintaining a predetermined position, and which also offers more favorable insulation conditions than encountered with known apparatus of this type.

This and other objects are accomplished according to the present invention by providing an initially substantially elongated spring element whose end portions may be bent about protrusions provided on a respective supporting portion and retained by shoulders formed in a recess defined in a respective handle. The supporting portion has a part adapted to be mounted on a wall portion of a pot and the like and a section extending from that part and defining the protrusions. The shoulders extend perpendicular to the direction of the extension of the section of the supporting portion extending from the mounting part and face away from the mounting part. An abutment is also preferably provided in the recess in the handle which extends transversely to the bending plane of the spring element and which engages a spring element in the center thereof.

The arrangement according to the present invention has among its advantages that the spring element does not have to be separately arranged in the handle as required by prior art apparatus, and that the spring element is form-fittingly held in the handle.

A preferred embodiment of the present invention has the spring element arranged in the recess in a plane which is perpendicular to both the direction of extension of the extending section of the supporting portion and to the plane of the shoulders. The recess extends at least to the dimensions of the spring element and defines an opening toward the mounting part of the supporting portion. The recess includes slots arranged to receive the ends of the spring element. These slots have frontal surfaces which form the shoulders which retain the ends of the spring element. This arrangement makes it possible for the spring element to be inserted into the recess without undue manipulation before the handle is placed onto a supporting portion.

Another advantageous feature of a preferred embodiment of the present invention has at least two spaced-apart, preferably molded-on, supporting ribs arranged to extend from a surface forming the recess and contact the spring element. A frontal surface of each of these supporting ribs is preferably arranged to be flush with the shoulders. Further, the spring element preferably has a circular cross section over its entire longitudinal extent.

Additional advantageous features of a preferred embodiment of the present invention provides a supporting portion having a U-shaped cross section. The part of the supporting portion to be mounted onto a pot and the like is in the form of a bar member, and the extending section is in the form of protruding arms. Preferably, the side surfaces defining the protrusions on these arms slope away from the direction of extension of the arms and toward the mounting part. The side surfaces converge with respective rear surfaces which extend substantially obliquely away from the direction of extension of the extending section of the supporting portion, so that the rear surfaces press the handle against a wall portion of a pot and the like under the biasing of the spring element.

With this preferred arrangement according to the present invention, the spring element, once its end portions are bent into position, can roll against the ribs extending from a surface of the recess and up against the rear surfaces of the protrusions within the limits of its elastic deformability. This greatly simplifies installation of the handle.

Most of all, with the arrangement according to the present invention, a handle may be pressed firmly, and without play, against a wall portion of a pot and the like by the bias of the spring element. In this manner, wide tolerances in, for example, the thicknesses of the layers on the pot wall—which may be, for example, a suitable, known enamel—are compensated.

BRIEF DESCRIPTION OF THE DRAWINGS

FIG. 1 is a schematic, partial, side elevational, cross-sectional view of apparatus according to the present invention mounted on the wall of a pot.

FIG. 2 is a partial, top plan view partially in cross section, of the apparatus of FIG. 1.

FIG. 3 is a cross-sectional view taken generally along line 3—3 of FIG. 2 showing the locking members before they engage.

FIG. 4 is a cross-sectional view similar to FIG. 3 showing the locking members in their engaged position.

DESCRIPTION OF THE PREFERRED EMBODIMENTS

FIGS. 1 and 2 show a U-shaped supporting portion 15 having a part 2 adapted to be mounted on a wall portion 1 of a pot and the like in a suitable, known manner, and a section 3 extending from part 2 and defining protrusions 4. Part 2 is in the form of a bar member which may be attached to wall portion 1 in any suitable, known manner, such as by an adhesive, a weld or the like, and rivets or other known fasteners. Supporting portion 15 is preferably constructed of a suitable, known metal, such as steel or aluminum. Section 3 is shown in the form of protruding arms which define the protrusions 4. An insulating handle 5 is shown in a position completely covering the supporting portion 15.

Handle 5 defines a recess 13 forming shoulders 8 which extend perpendicular to the direction of extension of section 3. Shoulders 8 are arranged to face away from part 2 and toward protrusions 4. Recess 13 defines an opening toward part 2. In addition, recess 13 includes slots 11 having frontal surfaces forming the shoulders 8.

A substantially elongated spring element 6 having end portions 7 is arranged within recess 13. Recess 13 extends at least to the dimensions of element 6, and is arranged such that element 6 may lie in a plane which is perpendicular to both the direction of extension of section 3 and to the plane of shoulders 8. Spring element 6 is preferably in the form of a rod constructed from a suitable, known spring wire and has a circular cross section over its entire longitudinal extent.

An abutment 9 is preferably formed in recess 13 to extend transversely to the bending plan of element 6. Abutment 9 is arranged to contact element 6 substantially in the center thereof.

At least two spaced-apart supporting ribs 14 may also be provided. These ribs 14, three of which are shown in the drawings, are arranged to extend from a surface of recess 13 and contact element 6. Further, a frontal surface of each of ribs 14 is preferably arranged so as to be flush with the surface of shoulders 8.

Protrusions for have side surfaces 10 which slope away from the direction of extension of the arms forming section 3 and toward part 2, and converge with respective rear surfaces 12 which extends substantially obliquely away from the direction of extension of section 3.

The manner in which the apparatus is assembled will now be described: first, part 2 of supporting portion 15 is mounted into a wall portion 1 of, for example, a pot in a known manner as referred to above. A spring 6 is arranged in the recess 13 of a handle 5. Handle 5 is then inserted onto supporting portion 15 by moving the handle 5 with the open side of recess 13 arranged foremost directly toward wall portion 1. As handle 5 moves relative to supporting portion 15, the end portions 7 of element 6 slide along and are guided by the front side surfaces 10 of protrusions 4. The slope of surfaces 10 cause the end portion 7 to be bent downwardly, as shown in FIG. 1, into the slots 11 so as to be retained by the shoulders 8. After the spring passes the point of convergence between surfaces 10 and surfaces 12 of protrusions 4, they contact the rear side surfaces 12 so that handle 5 is continuously pressed against wall portion 1 under the biasing of element 6. The handle 5 is now locked firmly in place.

FIG. 3 shows the relationship of the various components before the handle 5 is pushed over and completely covers a supporting portion 15. FIG. 4 shows a similar view of a handle 5 that has been placed and locked into a supporting portion 15.

With the preferred embodement of the present invention described above, a substantially elongated spring element 6 may be unreleasably arranged in recess 13 by having its end portion bent about protrusions 4 and contacting shoulders 8. In this manner, element 6 is retained by shoulders 8 to rigidly attach handle 5 to supporting portion 15.

It will be understood that the above description of the present invention is susceptible to various modifications, changes and adaptations, and the same are intended to be comprehended within the meaning and range of equivalents of the appended claims.

I claim:

1. Apparatus for mounting insulated handles to pots and the like, comprising, in combination:
   a. a supporting portion having a part adapted to be mounted on a wall portion of a pot or the like and a section extending from said part and defining protrusions;
   b. handle means for completely covering said supporting portion and defining a recess forming shoulders extending perpendicular to the direction of extension of said section of said supporting portion, which shoulders face away from said part of said supporting portion and towards said protrusions; and
   c. substantially elongated spring element unreleasably arranged in said recess by having its end portions bent about said protrusions and contacting said shoulders, said element being retained thereby to attach said handle means to said supporting portion.

2. Apparatus as defined in claim 1, further including an abutment formed in said recess and extending transversely to the bending plan of said spring element, said abutment arranged to contact said spring element substantially in the center thereof.

3. Apparatus as defined in claim 2, wherein said spring element is arranged in said recess in a plan which is perpendicular to both the direction of extension of said section of said supporting portion and to the plane of said shoulders, said recess extending at least to the dimensions of said spring element and defining an opening toward said part of said supporting portion, and wherein said recess includes slots arranged to receive the ends of said spring element, said slots having frontal surfaces forming said shoulders.

4. Apparatus as defined in claim 3, further including at least two spaced-apart supporting ribs arranged to extend from a surface of said recess and contact said spring element, a frontal surface of each of said supporting ribs being arranged to be flush with said shoulders.

5. Apparatus as defined in claim 4, wherein said spring element has a circular cross section over its entire longitudinal extent.

6. Apparatus as defined in claim 5, wherein said supporting portion has a U-shaped cross section, and wherein said part is in the form of a bar member and said section is in the form of protruding arms.

7. Apparatus as defined in claim 6, wherein said protrusions have front side surfaces which slope away from the direction of extension of said arms and toward said part of said supporting portion and converge with respective rear surfaces which extend substantially obliquely away from the direction of extension of said section of said supporting portion so that said rear surfaces press said handle against a wall portion of a pot and the like under the biasing of said spring element.

* * * * *